(12) United States Patent
Nakata

(10) Patent No.: US 7,255,873 B2
(45) Date of Patent: Aug. 14, 2007

(54) PROCESS FOR PRODUCING FATTY ACID SALT AND LIVESTOCK FEED CONTAINING THE FATTY ACID SALT

(75) Inventor: Masahide Nakata, Hyogo (JP)

(73) Assignee: Nichiyu Solution Incorporation, Tokyo (JP)

( * ) Notice: Subject to any disclaimer, the term of this patent is extended or adjusted under 35 U.S.C. 154(b) by 136 days.

(21) Appl. No.: 10/203,899

(22) PCT Filed: Feb. 23, 2001

(86) PCT No.: PCT/JP01/01351

§ 371 (c)(1),
(2), (4) Date: Aug. 15, 2002

(87) PCT Pub. No.: WO01/62698

PCT Pub. Date: Aug. 30, 2001

(65) Prior Publication Data

US 2003/0030028 A1 Feb. 13, 2003

(30) Foreign Application Priority Data

Feb. 24, 2000 (JP) .............................. 2000-047728
Sep. 18, 2000 (JP) .............................. 2000-281134

(51) Int. Cl.
*A23L 1/00* (2006.01)
*A23K 1/18* (2006.01)

(52) U.S. Cl. ...................... 424/438; 424/442; 426/516

(58) Field of Classification Search ................ 424/180, 424/2, 438, 442, 489, 499, 180.2; 426/516
See application file for complete search history.

(56) References Cited

U.S. PATENT DOCUMENTS 5,185,457 A * 2/1993 Carduck et al. ............... 554/71
5,252,667 A * 10/1993 Parker .......................... 525/85
5,496,572 A * 3/1996 Rudden ........................ 426/74
5,969,181 A   10/1999 Breitenbach et al.

FOREIGN PATENT DOCUMENTS

GB        1 074 093         6/1967

OTHER PUBLICATIONS

Communication and European Search Report mailed Jun. 14, 2004, for No. EP 01 90 6250.

* cited by examiner

*Primary Examiner*—Michael G. Hartley
*Assistant Examiner*—Micah-Paul Young
(74) *Attorney, Agent, or Firm*—Antonelli, Terry, Stout & Kraus, LLP.

(57) ABSTRACT

The invention is directed to a method for producing a fatty acid salt, the method comprising reacting a fatty acid with a metal oxide or a metal hydroxide by use of an extruder having at least a stock supply zone, a kneading/reaction zone, and a cooling zone. The invention provides a high-productivity, highly efficient method for continuously producing a fatty acid salt and a method for effectively producing a fatty acid salt having a high unsaturated fatty acid content and a low melting temperature.

7 Claims, 1 Drawing Sheet

PROCESS FOR PRODUCING FATTY ACID SALT AND LIVESTOCK FEED CONTAINING THE FATTY ACID SALT

TECHNICAL FIELD

The present invention relates to a method for producing fatty acid salts, and more particularly, to a method for continuously and effectively producing fatty acid salts which are employed as additives for plastics, paper, and similar materials; mold releasing agents; and feed for raising livestock such as reproductive female pigs and cows; i.e., female pigs and cows which are to produce offspring.

BACKGROUND ART

Conventionally, there have been known several methods for producing a fatty acid salt through reaction of a fatty acid with a metal oxide or a metal hydroxide; e.g., (1) the wet direct method, (2) the double decomposition method, and (3) the dry direct method (disclosed, for example, in "Properties and Applications of Metallic Soap," edited by Tokiyuki YOSHIDA et al., published by Saiwai Shobo (1988)).

Among these methods, (1) the wet direct method employs neutralization reaction in which a fatty acid in liquid form is added dropwise, with stirring, to a dispersion of a metal hydroxide micropowder in water, to thereby obtain a fatty acid salt. In (2) the double decomposition method, a fatty acid is added dropwise, with stirring, to an aqueous dispersion or aqueous solution of a hydroxide of an alkali metal such as sodium or potassium, to thereby synthesize alkali soap, and an aqueous solution of a metal chloride or sulfate is added dropwise to an aqueous solution of the alkali soap so as to react the alkali soap with the metal, to thereby obtain a fatty acid salt. When method (2) is employed, the overall reaction can be completed highly stoichiometrically. Therefore, method (2) has been a mainstream method among conventional fatty acid salt synthesis methods.

In (3) the dry direct method, a liquid fatty acid is sufficiently mixed with micropowder of a metal oxide or a metal hydroxide through high-speed agitation or a similar technique, and a predetermined amount of water is added to the resultant mixture, thereby inducing simultaneous reaction. As compared with the above methods (1) and (2), method (3) is advantageous in that no filtration step is required and that a drying step requiring a large amount of heat can be simplified.

DISCLOSURE OF THE INVENTION

Among the above three methods, methods (1) and (2), carried out in a batch manner, require large amounts of water. Therefore, large amounts of wastewater are produced, thereby reducing production per batch. For such a reason, production costs are elevated disadvantageously. Method (3) is advantageous with respect to the number of steps as compared with the aforementioned methods (1) and (2). However, method (3) also has a drawback in that products thereof tend to have poor uniformity caused by insufficient agitation during reaction. In addition, when method (3) is employed, fatty acid salts derived from soybean oil, corn oil, rapeseed oil, etc.—having a high unsaturated fatty acid content—are difficult to produce efficiently. The reason for the difficulty is as follows. Specifically, since fatty acids having a high unsaturated fatty acid content have a low melting temperature, the produced fatty acid salts also have a low melting temperature. Such fatty acids are viscous matter and are poor in reactivity, and reaction products adhere on inner walls of the reaction vessel, rendering collection of the products insufficient. Thus, yield of the products decreases considerably.

The present invention has been accomplished in order to solve the aforementioned problems. Thus, an object of the present invention is to provide a high-productivity, highly efficient method for continuously producing fatty acid salts. Another object of the present invention is to provide a method for effectively producing fatty acid salts having a low melting temperature, the fatty acid salts having a high unsaturated fatty acid content. Still another object of the invention is to provide a method for producing fatty acid salts suitable for feed for raising livestock such as reproductive female pigs and cows. Yet another object of the invention is to provide the above feed containing the fatty acid salts.

The present inventors have carried out extensive studies in order to solve the aforementioned problems, and have found that the above objects can be attained by reacting a fatty acid with a metal oxide or a metal hydroxide by use of an extruder serving as a mixer/reaction vessel. The present invention has been accomplished on the basis of the finding.

Accordingly, the present invention provides a method for producing a fatty acid salt, which comprises reacting a fatty acid with a metal oxide or a metal hydroxide by use of an extruder having at least a stock supply zone, a kneading/reaction zone, and a cooling zone. The present invention also provides feed for raising livestock, inter alia cows, containing the fatty acid salt produced through the above production method.

BEST MODE FOR CARRYING OUT THE INVENTION

Figure 1:
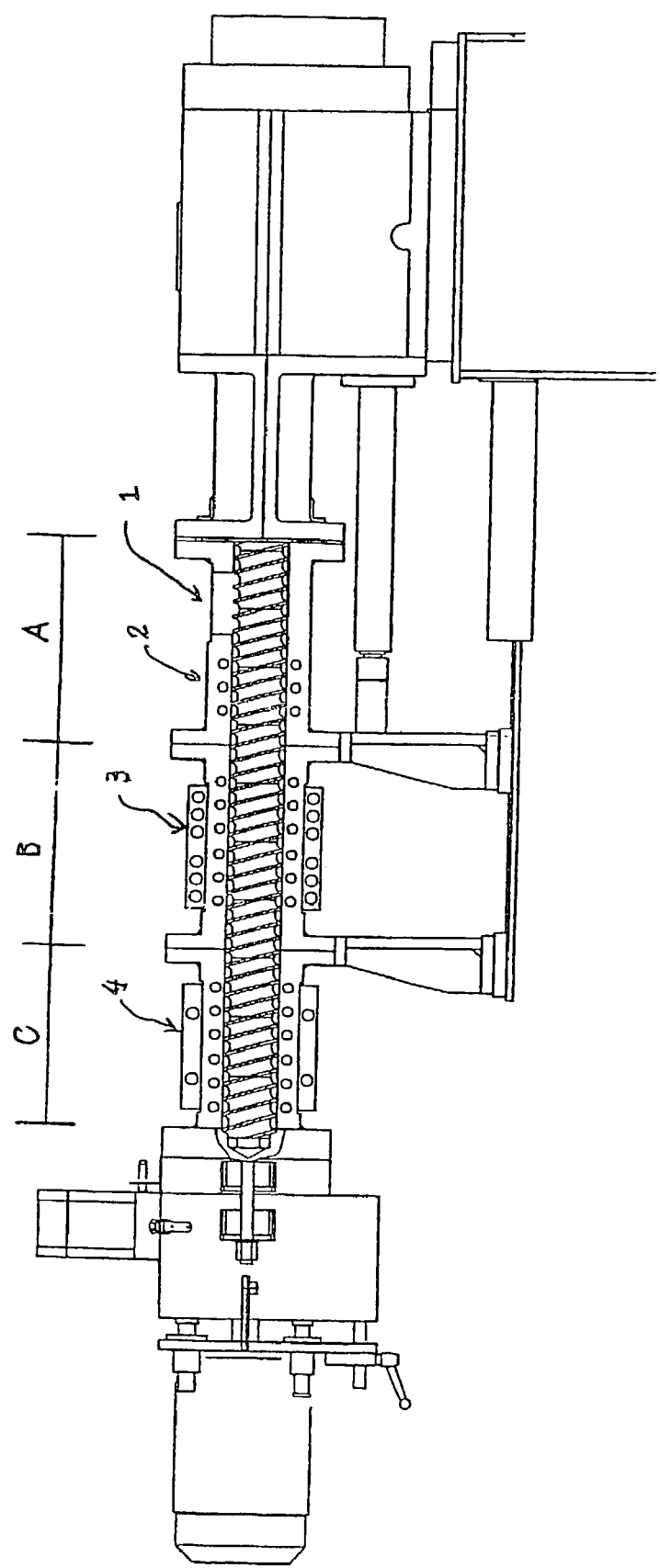
FIG. 1 is a cross-sectional view of one example of the extruder employed in the present invention.

The present invention will next be described in more detail.

The extruder employed in the method of the present invention is a type of pressure extruder. Among pressure extruders, there can be employed a single screw extruder having one rotatable screw inserted in a cylinder, or a twin screw extruder having two screws inserted in a cylinder forming an 8-shaped cross-section and being rotatable in the same direction or in opposite directions. In the present invention, a twin screw extruder is particularly preferred, from the viewpoint of kneading performance. Generally, each screw of the twin screw extruder comprises a plurality of appropriately assembled parts for carrying out operations such as feeding, reversing, and kneading. In the present invention, screws comprising appropriately assembled parts may be employed.

FIG. 1 is a cross-sectional view of one example of the extruder employable in the production method of the present invention. A cylinder of the extruder employable in the present invention is divided into a plurality of barrels corresponding to a stock supply zone A, a kneader/reaction zone B, a cooling zone C, etc. External jackets 2, 3, and 4 are provided around the corresponding barrels. Each jacket may serve as heating means or a cooling means for the respective barrel such that the jacket can be adapted to any of the aforementioned zones. In the method of the present invention, a fatty acid, a metal oxide or a metal hydroxide, and water are appropriately fed to the extruder through a stock inlet thereof 1 of the above stock supply zone A; the resultant mixture is allowed to react in the kneading/reaction zone B to thereby yield a fatty acid salt; and the salt is cooled in the cooling zone C.

Kneading must be performed at least in the kneading/reaction zone, and preferably, kneading is also performed in the stock supply zone or in the cooling zone.

As mentioned above, the screws for working in the kneading/reaction zone may comprise a plurality of appropriately assembled parts for carrying out operations such as feeding, reversing, and kneading. Through employment of such combination of screws, the residence time and mixing degree of the reactants residing in the kneading/reaction zone can be adjusted appropriately.

The production method of the present invention is carried out at a stock supply zone temperature of 20 to 80° C., preferably 30 to 70° C.; a kneading/reaction zone temperature of 80 to 200° C., preferably 100 to 190° C.; and a cooling zone temperature of −20 to 5° C., preferably −15 to 0° C. When the temperature of any of the zones deviates from the aforementioned corresponding temperature range, the target effects of the present invention may fail to be attained.

The reaction time for the reactants residing in the extruder may be preset appropriately in accordance with purposes of reaction. However, in order to attain the aforementioned objects of the present invention, the reaction time is 5-120 seconds, preferably 10-100 seconds. Such reaction times can be attained by causing the reactants to reside in the kneading/reaction zone for, for example, the aforementioned residence time.

Examples of the fatty acid serving as a starting material employed in the method of the present invention include fatty acids and mixtures thereof obtained by decomposing and purifying oils and fats. Examples of the oils and fats include animal fats such as beef tallow, lard, and fish oil; vegetable oils such as soybean oil, corn oil, rapeseed oil, sunflower oil, safflower oil, linseed oil, sesame oil, palm oil, evening primrose oil, and borage oil; and oils and fats produced by a variety of microorganisms. Purified single-component fatty acids such as oleic acid, linoleic acid, bishomo-γ-linolenic acid, arachidonic acid, eicosapentaenoic acid, and linolenic acid and mixtures or compositions thereof may also be employed.

Among the aforementioned fatty acids, those having a high unsaturated fatty acid content and a melting temperature falling within a range of −50 to 40° C., preferably −45 to 39° C. are particularly preferred. Examples of the fatty acids include those obtained by decomposing and purifying oils and fats, and examples of the oils and fats include fish oil, soybean oil, corn oil, rapeseed oil, sunflower oil, safflower oil, sesame oil, palm oil, evening primrose oil, borage oil, and linseed oil. Single-component fatty acids such as eicosapentaenoic acid, oleic acid, linoleic acid, bishomo-γ-linolenic acid, arachidonic acid, and linolenic acid may also be employed. When these fatty acids are employed in the method of the present invention, effects of the fatty acids are fully attained.

The metal of the metal oxide and metal hydroxide is calcium, magnesium, nickel, aluminum, zinc, etc. Specific examples of preferably employed metal oxides and metal hydroxides include calcium hydroxide, nickel hydroxide, magnesium hydroxide, zinc hydroxide, calcium oxide, nickel oxide, magnesium oxide, zinc oxide, and aluminum oxide. Since the method for producing a fatty acid salt of the present invention is based on reaction of three components; i.e., an oily fatty acid, a solid metal oxide or metal hydroxide, and water, the aforementioned metal oxide or metal hydroxide in the micropowder form is preferably used, taking requirement of sufficient agitation and mixing into account.

The amount of the metal oxide or metal hydroxide used in the present invention is 0.55-1.0 mol, preferably 0.6-0.9 mol, based on 1 mol of the fatty acid.

In the present invention, addition of water is required during the reaction of the fatty acid and the metal oxide or metal hydroxide.

Generally, in the case of reaction of the fatty acid with the metal oxide, water is required to be added in a stoichiometric amount of 1 mol on the basis of 1 mol of the metal oxide (3 mol of water is required in the case of aluminum oxide). Accordingly, in the present invention, water (1.0-4.0 mol (3.0-12 mol in the case of aluminum oxide)) is added, for example, from the top of a first barrel (hereinafter referred to as a No. 1 barrel) of the stock supply zone of the extruder. The amount of water added may be adjusted appropriately in consideration of reaction temperature, residence time in the reaction system, and other factors.

In the case of reaction of the fatty acid with the metal hydroxide, a small amount of water must be added to initiate the reaction. Also in this case, water (0.2-1.0 mol on the basis of 1 mol of the metal hydroxide (0.6-3.0 mol in the case of aluminum hydroxide)) is added from the top of the aforementioned No. 1 barrel.

The fatty acid salts obtained through the production method of the present invention may be employed as additives for plastics, paper, and similar materials; mold releasing agents; and specific ingredients of feed for reproductive female pigs. When such a fatty acid salt is employed as a specific ingredient, propagation results (shortening of days of returning estrus, increase in litter size and number of delactation, etc.) can be remarkably enhanced, leading to remarkable enhancement of productivity of piglets, by feeding the fatty acid salts in a daily amount of 20-200 g per female pig during a period within three weeks after artificial insemination.

The aforementioned fatty acid salt also serves as a specific ingredient of feed for cows. When the cows are nulliparas and undergo artificial insemination, by feeding the feed to each nullipara in a daily amount of 100-300 g (as reduced to the fatty acid salt) from two weeks before the scheduled artificial insemination day to three to six weeks after completion of artificial insemination, conception rate can be enhanced. When the cows are primi- or multiparas, by feeding the feed to each primi- or multipara in a daily amount of 100-300 g (as reduced to the fatty acid salt) from immediately after delivery to three to six weeks after completion of the following artificial insemination, shortening of days of returning estrus, shortening of non-pregnancy days, and conception rate can be remarkably enhanced. In the case in which embryo transfer is carried out, by feeding the feed to each donor cow in a daily amount of 100-300 g (as reduced to the fatty acid salt) from two weeks before artificial insemination to ovum collection (total three weeks), the number of ova collected and the number of healthy ova can be remarkably increased. Feeding the feed in a daily amount, for each recipient cow, of 100-300 g (as reduced to the fatty acid salt) from two weeks before scheduled embryo transfer to three to six weeks after completion of embryo transfer effectively promotes embryo nidation, to thereby remarkably enhance conception ratio.

The above fatty acid salt can be readily incorporated into feed by use of a mixer, and may be added to feed during feeding.

According to the production method of the present invention, a high-productivity, highly efficient method for continuously producing a fatty acid salt can be provided. In addition, a fatty acid salt having a high unsaturated fatty acid content and a low melting temperature, which has been conventionally produced only through a batch method, can be continuously produced at high efficiency.

As described above, according to the production method of the present invention, a fatty acid salt which has been conventionally produced at low productivity can be produced at high efficiency, proving that the present method is of great value in the industry.

The fatty acid salts obtained through the production method of the present invention may be employed as additives for plastics, paper, and similar materials; mold releasing agents; and feed for raising livestock such as reproductive female pigs and cows.

The present invention will next be described in more detail by way of examples, which should not be construed as limiting the scope of the invention.

EXAMPLE 1

Soybean oil fatty acid (melting temperature: $-2°$ C.) that had been heated to $40°$ C. in advance and calcium hydroxide were supplied to a No. 1 barrel of an extruder (model EA-100; manufactured by Suehiro EPM Corporation) through a stock inlet thereof, at rates of 100 kg/h and 20 kg/h, respectively. Water was supplied through a water inlet provided in the upper section of the No. 1 barrel at a rate of 3 kg/h. The temperature of the jackets for No. 1 and No. 2 barrels (stock supply zone) was preset at $70°$ C., that for No. 3 and No. 4 barrels (kneading/reaction zone) was preset at $180°$ C., and that for No. 5 and No. 6 barrels (cooling zone) was preset at $-10°$ C., and reaction was allowed to proceed continuously for 5 hours at a screw speed of 120 rpm. After completion of reaction, a fatty acid calcium product having a percent reaction, yield, and percent yield shown in Table 1 was obtained. The number of days required for the process and the amount of production are also shown in Table 1.

EXAMPLE 2

The general procedure of Example 1 was repeated, except that the following changes were made: Soybean oil fatty acid was replaced by corn oil fatty acid (melting temperature: $-10°$ C.); calcium hydroxide (20 kg/h) was replaced by nickel hydroxide (25 kg/h); the temperature of the jackets for No. 3 and No. 4 barrels (kneading/reaction zone) was changed from $180°$ C. to $150°$ C.; and the temperature of the jackets for No. 5 and No. 6 barrels (cooling zone) was changed from $-10°$ C. to $-5°$ C. After completion of reaction, a fatty acid nickel product having a percent reaction, yield, and percent yield shown in Table 1 was obtained. The number of days required for the process and the amount of production are also shown in Table 1.

EXAMPLE 3

The general procedure of Example 1 was repeated, except that the following changes were made: Soybean oil fatty acid was replaced by eicosapentaenoic acid (melting temperature: $-44°$ C., product of NOF Corporation); calcium hydroxide (20 kg/h) was replaced by magnesium hydroxide (16 kg/h); and the screw speed was changed from 120 rpm to 100 rpm. After completion of reaction, a fatty acid magnesium product having a percent reaction, yield, and percent yield shown in Table 1 was obtained. The number of days required for the process and the amount of production are also shown in Table 1.

EXAMPLE 4

The general procedure of Example 1 was repeated, except that the following changes were made: Soybean oil fatty acid was replaced by rapeseed oil fatty acid (melting temperature: $-5°$ C.); calcium hydroxide (20 kg/h) was replaced by magnesium hydroxide (16 kg/h); the temperature of the jackets for No. 3 and No. 4 barrels (kneading/reaction zone) was changed from $180°$ C. to $120°$ C.; and the temperature of the jackets for No. 5 and No. 6 barrels (cooling zone) was changed from $-10°$ C. to $-15°$ C. After completion of reaction, a fatty acid magnesium product having a percent reaction, yield, and percent yield shown in Table 1 was obtained. The number of days required for the process and the amount of production are also shown in Table 1.

EXAMPLE 5

The general procedure of Example 1 was repeated, except that the following changes were made: Soybean oil fatty acid was replaced by sunflower oil fatty acid (melting temperature: $-18°$ C.); calcium hydroxide (20 kg/h) was replaced by zinc hydroxide (24 kg/h); the temperature of the jackets for No. 5 and No. 6 barrels (cooling zone) was changed from $-10°$ C. to $-5°$ C.; and the screw speed was changed from 120 rpm to 150 rpm. After completion of reaction, a fatty acid zinc product having a percent reaction, yield, and percent yield shown in Table 1 was obtained. The number of days required for the process and the amount of production are also shown in Table 1.

EXAMPLE 6

The general procedure of Example 1 was repeated, except that the following changes were made: Soybean oil fatty acid was replaced by Extralinolenic-70 (melting temperature: $-25°$ C., product of NOF Corporation); calcium hydroxide (20 kg/h) was replaced by magnesium hydroxide (13 kg/h); the temperature of the jackets for No. 3 and No. 4 barrels (kneading/reaction zone) was changed from $180°$ C. to $100°$ C.; and the temperature of the jackets for No. 5 and No. 6 barrels (cooling zone) was changed from $-10°$ C. to $-5°$ C. After completion of reaction, a fatty acid magnesium product having a percent reaction, yield, and percent yield shown in Table 1 was obtained. The number of days required for the process and the amount of production are also shown in Table 1.

EXAMPLE 7

The general procedure of Example 1 was repeated, except that soybean oil fatty acid was replaced by safflower oil fatty acid (melting temperature: $-15°$ C.) and the temperature of the jackets for No. 3 and No. 4 barrels (kneading/reaction zone) was changed from $180°$ C. to $160°$ C. After completion of reaction, a fatty acid calcium product having a percent reaction, yield, and percent yield shown in Table 1 was obtained. The number of days required for the process and the amount of production are also shown in Table 1.

EXAMPLE 8

The general procedure of Example 1 was repeated, except that the following changes were made: Soybean oil fatty acid was replaced by sesame oil fatty acid (melting temperature: −5° C.); calcium hydroxide (20 kg/h) was replaced by aluminum hydroxide (25.6 kg/h); the temperature of the jackets for No. 3 and No. 4 barrels (kneading/reaction zone) was changed from 180° C. to 190° C.; and the temperature of the jackets for No. 5 and No. 6 barrels (cooling zone) was changed from −10° C. to −5° C. After completion of reaction, a fatty acid aluminum product having a percent reaction, yield, and percent yield shown in Table 1 was obtained. The number of days required for the process and the amount of production are also shown in Table 1.

EXAMPLE 9

The general procedure of Example 1 was repeated, except that the following changes were made: Soybean oil fatty acid was replaced by sunflower oil fatty acid (melting temperature: −18° C.); calcium hydroxide (20 kg/h) was replaced by aluminum hydroxide (25.6 kg/h); the temperature of the jackets for No. 3 and No. 4 barrels (kneading/reaction zone) was changed from 180° C. to 190° C.; and the temperature of the jackets for No. 5 and No. 6 barrels (cooling zone) was changed from −10° C. to −5° C. After completion of reaction, a fatty acid aluminum product having a percent reaction, yield, and percent yield shown in Table 1 was obtained. The number of days required for the process and the amount of production are also shown in Table 1.

EXAMPLE 10

The general procedure of Example 1 was repeated, except that the following changes were made: Soybean oil fatty acid was replaced by palm oil fatty acid (melting temperature: 38° C.); the temperature of the jackets for No. 3 and No. 4 barrels (kneading/reaction zone) was changed from 180° C. to 170° C.; and the screw speed was changed from 120 rpm to 80 rpm. After completion of reaction, a fatty acid calcium product having a percent reaction, yield, and percent yield shown in Table 1 was obtained. The number of days required for the process and the amount of production are also shown in Table 1.

COMPARATIVE EXAMPLE 1

Synthesis of Fatty Acid Calcium Through the Wet Direct method

Water (400 kg) and calcium hydroxide micropowder (20.3 kg) were charged into a 1,000-L reaction vessel equipped with a stirrer and a jacket, to thereby yield a uniform dispersion. The dispersion was heated to 60° C., and under stirring, soybean oil fatty acid (melting temperature: −2° C., 100 kg) that had been heated to 40° C. in advance was added dropwise to the dispersion over 30 minutes. Stirring was continued for 1 hour for ripening. At this point in time, the reaction was almost complete, and the volume of the reaction mixture contained in the vessel measured about 600 L. Subsequently, the reaction mixture was repeatedly filtered through a 100-L pressure filter (6 times), to thereby yield about 380 kg of a reaction product having a moisture content of 70%. The reaction product was dried with a hot-air drier (continuous type), to thereby produce fatty acid calcium having a percent reaction, yield, and percent yield shown in Table 1. The number of days required for the process and the amount of production are also shown in Table 1.

COMPARATIVE EXAMPLE 2

Synthesis of Fatty Acid Nickel Through the Wet Direct Method

The general procedure of Comparative Example 1 was repeated, except that calcium hydroxide micropowder (20.3 kg) was replaced by nickel hydroxide micropowder (25.4 kg) and soybean oil fatty acid (melting temperature: −2° C.) was replaced by corn oil fatty acid (melting temperature: −10° C.). After completion of reaction, a fatty acid nickel product having a percent reaction, yield, and percent yield shown in Table 1 was obtained. The number of days required for the process and the amount of production are also shown in Table 1.

COMPARATIVE EXAMPLE 3

Synthesis of Fatty Acid Magnesium Through the Wet Direct Method

The general procedure of Comparative Example 1 was repeated, except that calcium hydroxide micropowder (20.3 kg) was replaced by magnesium hydroxide micropowder (14.8 kg) and soybean oil fatty acid (melting temperature: −2° C.) was replaced by eicosapentaenoic acid (melting temperature: −44° C., product of NOF Corporation). After completion of reaction, a fatty acid magnesium product having a percent reaction, yield, and percent yield shown in Table 1 was obtained. The number of days required for the process and the amount of production are also shown in Table 1.

COMPARATIVE EXAMPLE 4

Synthesis of Fatty Acid Magnesium Through the Double Decomposition Method

Water (400 kg) and sodium hydroxide (16.1 kg) were charged into a 1,000-L reaction vessel equipped with a stirrer and a jacket, to thereby yield a solution. The solution was heated to 80° C., and under stirring, rapeseed oil fatty acid (melting temperature: −5° C., 100 kg) that had been heated to 40° C. in advance was added dropwise to the solution over 30 minutes. Stirring was continued for a further 1 hour for neutralization and ripening, to thereby synthesize fatty acid sodium. Subsequently, a solution of magnesium sulfate (33.0 kg) in water (100 kg) was prepared in a separate container, and the solution was added dropwise to the above-prepared aqueous fatty acid sodium solution under stirring for 1 hour. Stirring was continued for a further 1 hour for ripening the mixture. At this point in time, the reaction mixture measured about 800 L. The reaction mixture was repeatedly filtered through a 100-L pressure filter (8 times), to thereby yield 363 kg of fatty acid magnesium having a moisture content of 70%. The resultant reaction product was dried with a hot-air drier (continuous type), to thereby produce fatty acid magnesium having a percent reaction, yield, and percent yield shown in Table 1. The number of days required for the process and the amount of production are also shown in Table 1.

COMPARATIVE EXAMPLE 5

Synthesis of Fatty Acid Zinc Through the Double Decomposition Method

The general procedure of Comparative Example 4 was repeated, except that the following changes were made: Sodium hydroxide (16.1 kg) was replaced by potassium hydroxide (22.6 kg); magnesium sulfate (33.0 kg) was replaced by zinc sulfate (44.3 kg); and rapeseed oil fatty acid (melting temperature: −5° C.) was replaced by sunflower oil fatty acid (melting temperature: −18° C.). After completion of reaction, a fatty acid zinc product having a percent reaction, yield, and percent yield shown in Table 1 was obtained. The number of days required for the process and the amount of production are also shown in Table 1.

COMPARATIVE EXAMPLE 6

Synthesis of Fatty Acid Magnesium Through the Double Decomposition Method

The general procedure of Comparative Example 4 was repeated, except that sodium hydroxide (16.1 kg) was replaced by potassium hydroxide (22.6 kg) and rapeseed oil fatty acid (melting temperature: −5° C.) was replaced by Extralinolenic-70 (melting temperature: −25° C., product of NOF Corporation). After completion of reaction, a fatty acid magnesium product having a percent reaction, yield, and percent yield shown in Table 1 was obtained. The number of days required for the process and the amount of production are also shown in Table 1.

COMPARATIVE EXAMPLE 7

Synthesis of Fatty Acid Calcium Through the Dry Direct Method

To a reaction vessel equipped with a stirrer and a jacket, safflower oil fatty acid (melting temperature: −15° C., 100 kg) was added and heated to 80° C. Calcium oxide micropowder (15.4 kg) was added thereto, and the mixture was stirred sufficiently until a uniform dispersion was obtained. While the reaction mixture was stirred, water (19.8 kg) was added to the dispersion, to thereby induce the reaction to proceed promptly. After the reaction was allowed to proceed for 1 hour, the jacket temperature was raised to 105° C., to thereby dry the reaction mixture under stirring for 3 hours. The contents were collected, whereby fatty acid calcium having a percent reaction, yield, and percent yield shown in Table 1 was obtained. The number of days required for the process and the amount of production are also shown in Table 1. As shown in Table 1, the percent yield finally obtained was found to be low, because unreacted fatty acids and the viscous reaction product had adhered to inner walls of the vessel and stirrer blades, whereby they fail to be collected completely.

COMPARATIVE EXAMPLE 8

Synthesis of Fatty Acid Aluminum Through the Dry Direct Method

The general procedure of Comparative Example 7 was repeated, except that safflower oil fatty acid (melting temperature: −15° C.) was replaced by sesame oil fatty acid (melting temperature: −5° C.) and calcium oxide micropowder (15.4 kg) was replaced by aluminum oxide (37.3 kg). After completion of reaction, a fatty acid aluminum product having a percent reaction, yield, and percent yield shown in Table 1 was obtained. The number of days required for the process and the amount of production are also shown in Table 1.

COMPARATIVE EXAMPLE 9

Synthesis of Fatty Acid Aluminum Through the Dry Direct Method

The general procedure of Comparative Example 7 was repeated, except that safflower oil fatty acid (melting temperature: −15° C.) was replaced by sunflower oil fatty acid (melting temperature: −18° C.) and calcium oxide micropowder (15.4 kg) was replaced by aluminum oxide micropowder (37.3 kg). After completion of reaction, a fatty acid aluminum product having a percent reaction, yield, and percent yield shown in Table 1 was obtained. The number of days required for the process and the amount of production are also shown in Table 1.

TABLE 1

|  | Examples | | | | | |
|---|---|---|---|---|---|---|
|  | 1 | 2 | 3 | 4 | 5 | 6 |
| Fatty acid | Soybean oil | Corn oil | EPA*[1] | Rapeseed oil | Sunflower oil | ELN-70*[2] |
| Metal | Calcium | Nickel | Magnesium | Magnesium | Zinc | Magnesium |
| Yield (kg) | 557 | 582 | 566 | 566 | 536 | 570 |
| Percent yield (%) | 98.0 | 98.0 | 97.0 | 97.0 | 98.0 | 98.0 |
| Percent reaction (%) | 99.9 | 99.8 | 99.8 | 99.8 | 98.5 | 99.7 |
| Number of days required*[3] (day) | 0.6 | 0.6 | 0.6 | 0.6 | 0.6 | 0.6 |
| Productivity*[4] (kg/day) | 928 | 970 | 943 | 943 | 893 | 950 |

|  | Examples | | | | Comparative Examples | | |
|---|---|---|---|---|---|---|---|
|  | 7 | 8 | 9 | 10 | 1 | 2 | 3 |
| Fatty acid | Safflower oil | Sesame oil | Sunflower oil | Palm oil | Soybean oil | Corn oil | EPA*[1] |
| Metal | Calcium | Aluminum | Aluminum | Calcium | Calcium | Nickel | Magnesium |
| Yield (kg) | 557 | 570 | 570 | 557 | 114 | 120 | 110 |
| Percent yield (%) | 98.0 | 98.0 | 98.0 | 98.0 | 95 | 94 | 94 |
| Percent reaction (%) | 99.5 | 98.5 | 98.5 | 99.8 | 99.8 | 90.2 | 82.2 |
| Number of days required*[3] (day) | 0.6 | 0.6 | 0.6 | 0.6 | 2.6 | 2.9 | 2.9 |
| Productivity*[4] (kg/day) | 928 | 950 | 950 | 928 | 43.8 | 41.4 | 37.9 |

TABLE 1-continued

| | Comparative Examples | | | | | |
|---|---|---|---|---|---|---|
| | 4 | 5 | 6 | 7 | 8 | 9 |
| Fatty acid | Rapeseed oil | Sunflower oil | ELN-70[*2] | Safflower oil | Sesame oil | Sunflower oil |
| Metal | Magnesium | Zinc | Magnesium | Calcium | Aluminum | Aluminum |
| Yield (kg) | 109 | 119 | 120 | 92 | 93 | 79.9 |
| Percent yield (%) | 95 | 95 | 95 | 81.0 | 80.1 | 78.0 |
| Percent reaction (%) | 99.9 | 99.5 | 99.5 | 92.6 | 65.3 | 68.7 |
| Number of days required[*3] (day) | 3.2 | 3.2 | 3.2 | 0.8 | 0.8 | 0.8 |
| Productivity[*4] (kg/day) | 34.1 | 37.2 | 37.5 | 115 | 116 | 99.9 |

[*1]Eicosapentaenoic acid
[*2]Extralinolenic-70
[*3]The number of days required for the process is calculated by dividing total required hours by 8 hours, which is considered 1 day.
[*4]Productivity (kg/day) = yield (kg)/number of days required (day)

As is apparent from Table 1, the wet direct method and the double decomposition method, both of which are based on aqueous reaction, provide high percent reaction and percent yield. However, the methods require long periods of time for filtration and drying, resulting in a low productivity. The dry direct method achieves simplification of steps, but percent reaction and percent yield each is low. In contrast, according to the method of the present invention, percent reaction and percent yield each is high, the process is simplified, and productivity is remarkably excellent.

INDUSTRIAL APPLICABILITY

The present invention relates to a method for producing fatty acid salts, and more particularly, to a method for continuously and effectively producing fatty acid salts which are employed as additives for plastics, paper, and similar materials; mold releasing agents; and feed for raising livestock such as reproductive female pigs and cows; i.e., female pigs and cows which are to produce offspring.

When such a fatty acid is incorporated into feed for reproductive female pigs, propagation results (shortening of days of returning estrus, increase in litter size and number of delactation, etc.) can be remarkably enhanced, leading to remarkable enhancement of productivity of piglets, by feeding the fatty acid in a daily amount of 20-200 g per pig during a period within three weeks after artificial insemination.

In the case in which the aforementioned fatty acid salt is incorporated into feed for cows, when the cows are nulliparas and undergo artificial insemination, by feeding the feed to each nullipara in a daily amount of 100-300 g (as reduced to the fatty acid salt) from two weeks before the scheduled artificial insemination day to three to six weeks after completion of artificial insemination, conception rate can be enhanced. When the cows are primi- or multiparas, by feeding the feed to each primi- or multipara in a daily amount of 100-300 g (as reduced to the fatty acid salt) from immediately after delivery to three to six weeks after completion of the following artificial insemination, shortening of days of returning estrus, shortening of non-pregnancy days, and conception rate can be remarkably enhanced. In the case in which embryo transfer is carried out, by feeding the feed to each donor cow in a daily amount of 100-300 g (as reduced to the fatty acid salt) from two weeks before artificial insemination to ovum collection (total three weeks), the number of ova collected and the number of healthy ova can be remarkably increased. Feeding the feed in a daily amount, for each recipient cow, of 100-300 g (as reduced to the fatty acid salt) from two weeks before embryo transfer to three to six weeks after completion of scheduled embryo transfer effectively promotes embryo nidation, to thereby remarkably enhance conception ratio.

The invention claimed is:

1. A method for producing a fatty acid salt, which comprises reacting a fatty acid having a melting temperature of −50° to 40° C. with a metal oxide or a metal hydroxide by use of an extruder having at least a stock supply zone, a kneading/reaction zone, and a cooling zone, with kneading being performed in each of said stock supply zone, said kneading/reaction zone and said cooling zone,
wherein the method is carried out at a temperature of the stock supply zone of 20 to 80° C., at a temperature of the kneading/reaction zone of 80 to 200° C., and at a temperature of the cooling zone of −20 to 5° C., and
wherein the water is supplied to the stock supply zone in an amount of 1.0 to 4.0 moles based on 1 mole of the metal oxide except in the case of aluminum oxide, the water being supplied to the stock supply zone in an amount of 3.0 to 12 moles based on 1 mole of the metal oxide in the case of aluminum oxide, and in an amount of 0.2 to 1.0 moles based on 1 mole of the metal hydroxide except in the case of aluminum hydroxide, the water being supplied in an amount of 0.6 to 3.0 moles based on 1 mole of the metal hydroxide in the case of aluminum hydroxide.

2. A method fDr producing a fatty acid salt as described in claim 1, wherein the fatty acid includes fatty acid obtained by decomposing and/or purifying at least one species selected from soybean oil, corn oil, rapeseed oil, sunflower oil, safflower oil, sesame oil, palm oil, and fish oil.

3. A method for producing a fatty acid salt as described in claim 2, wherein the metal oxide or the metal hydroxide is an oxide or a hydroxide of calcium, magnesium, nickel, aluminum, or zinc.

4. A method for producing a fatty acid salt as described in claim 1, wherein the metal oxide or the metal hydroxide is an oxide or a hydroxide of calcium, magnesium, nickel, aluminum, or zinc.

5. A method for producing a fatty acid salt as described in claim 1, wherein said fatty acid salt is adapted to be included in a feed for raising livestock.

6. A method for producing a fatty acid salt as described in claim 1, wherein said extruder is a pressure extruder.

7. A method for producing a fatty acid salt as described in claim 1, wherein the method is carried out at a temperature of the stock supply zone of 30 to 70° C., at a temperature of the kneading/reaction zone of 100 to 190° C., and at a temperature of the cooling zone of −15 to 0° C.

* * * * *